United States Patent [19]

Flachbarth et al.

[11] 4,428,641
[45] Jan. 31, 1984

[54] CABLE COUPLER/WIRING ADAPTOR

[75] Inventors: Charles T. Flachbarth, Parkersburg; Richard D. Benscoter, Vienna, both of W. Va.

[73] Assignee: Butler Manufacturing Company, Kansas City, Mo.

[21] Appl. No.: 327,945

[22] Filed: Dec. 7, 1982

[51] Int. Cl.³ .......................................... H01R 13/514
[52] U.S. Cl. .................................................... 339/205
[58] Field of Search ............... 339/204, 205, 141, 208, 339/210, 154, 156

[56] References Cited

U.S. PATENT DOCUMENTS

| | | | |
|---|---|---|---|
| 2,318,651 | 5/1943 | Penfold | 339/205 |
| 2,702,878 | 2/1955 | Heibel | 339/205 |
| 2,942,230 | 6/1960 | Gluck | 339/154 R |
| 4,392,701 | 7/1983 | Weidler | 339/156 R |

Primary Examiner—Joseph H. McGlynn
Assistant Examiner—P. Austin
Attorney, Agent, or Firm—Frederick J. Olsson

[57] ABSTRACT

A device used in overhead power distribution systems to serve solely as a cable coupler, i.e. join or splice a pair of flexible connecting cables having a plug-in connector at opposite ends or alternatively slightly modified so to serve as a wiring adaptor, i.e. to be secured to a unit to be energized and provide the power either from a single flexible cable or from a pair of flexible cables which are spliced together. A typical example of a unit to be energized is an overhead lighting fixture or a service pole.

2 Claims, 6 Drawing Figures

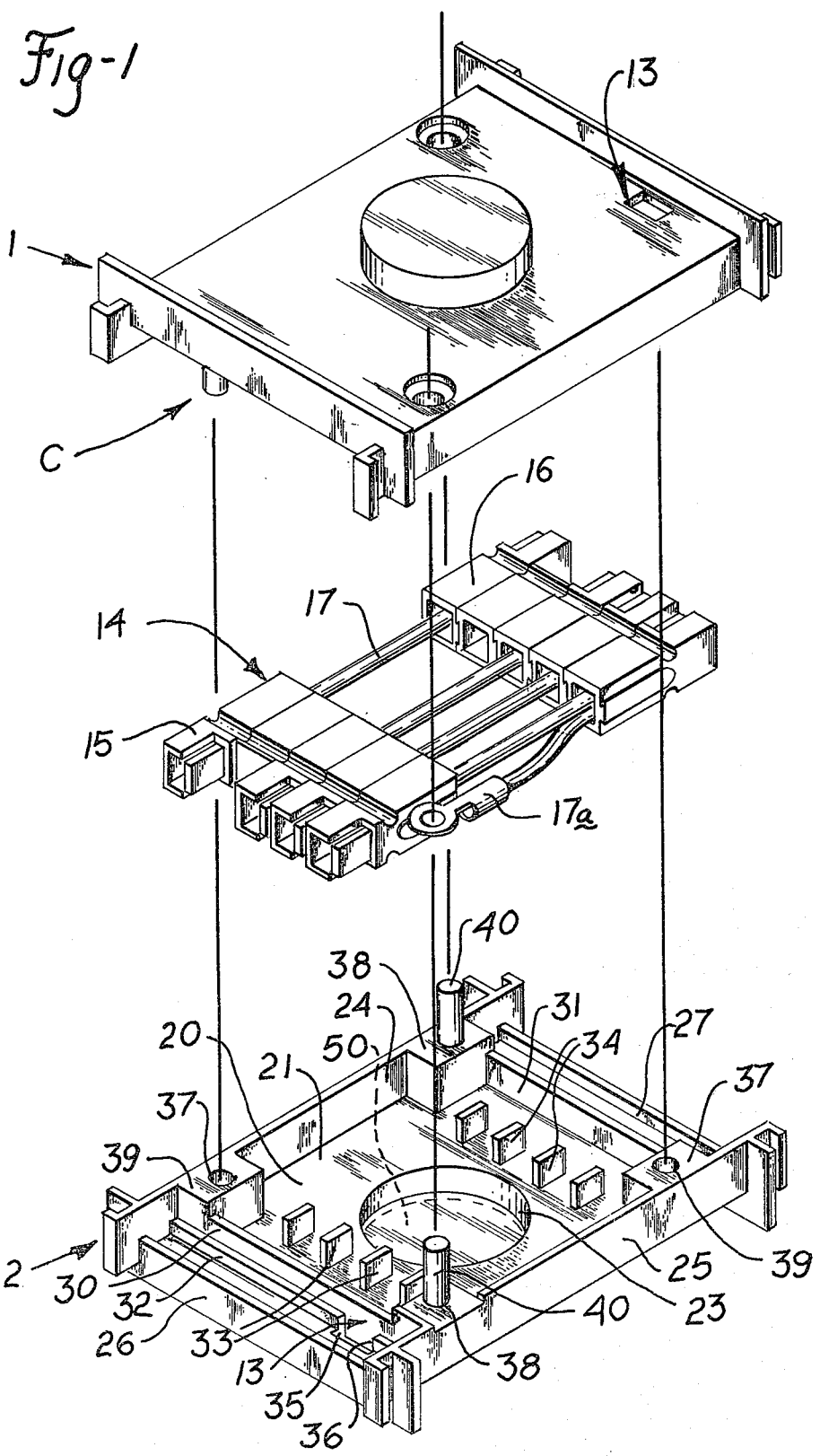

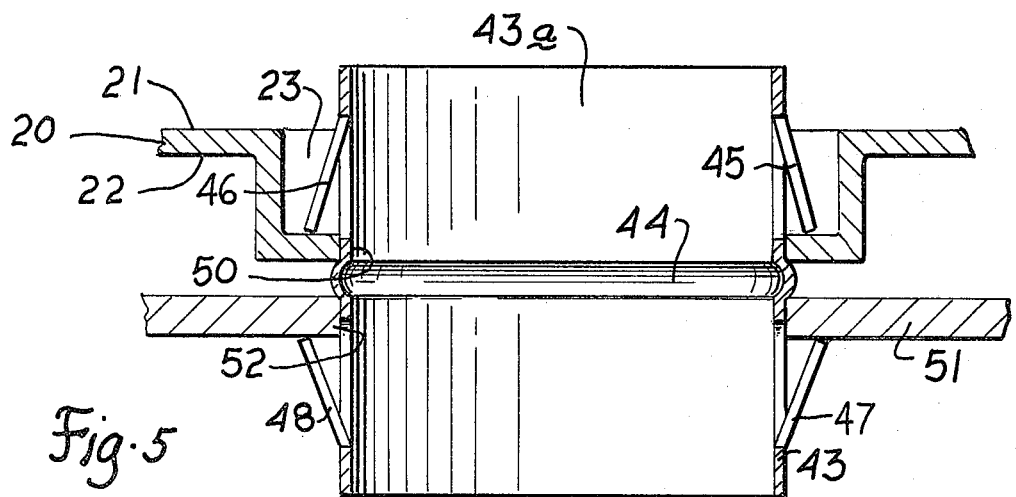
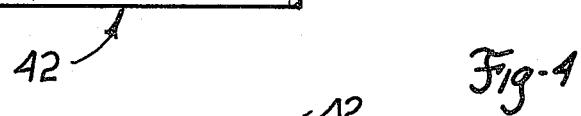
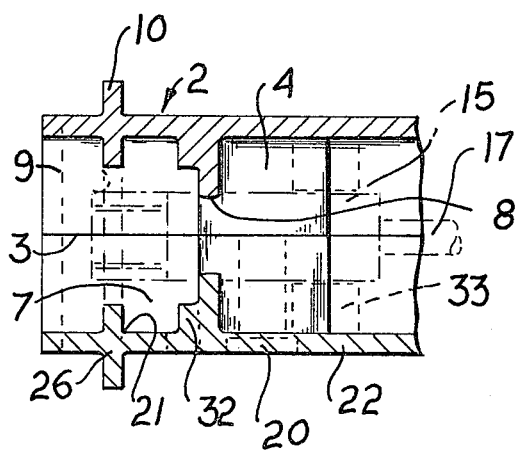
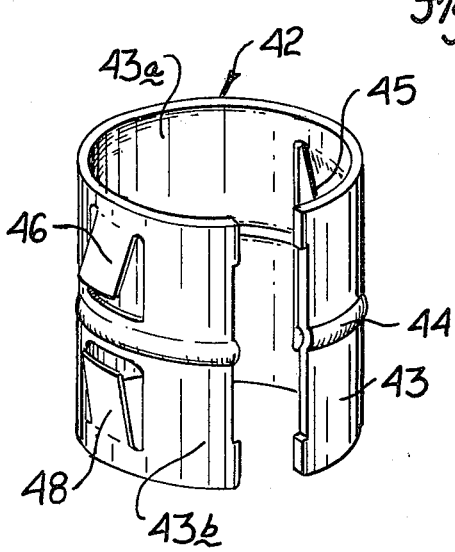
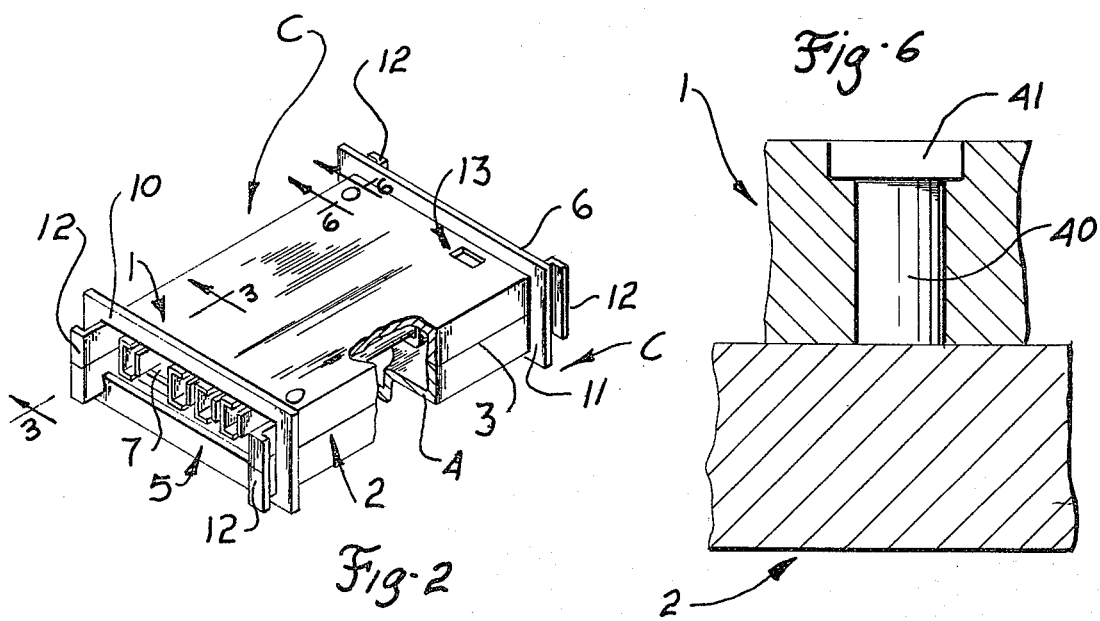

4,428,641

CABLE COUPLER/WIRING ADAPTOR

This invention in general relates to overhead power distribution systems of the kind arrayed in the plenum above suspended ceilings in office and commercial buildings and the like and more specifically the invention relates to components for use in such systems.

Overhead distribution systems of the kind in question conventionally employ basic items such as flexible cables and couplers to transfer power to the various units served by the system, for example, lighting fixtures, service poles, and the like. Such a flexible cable normally comprises a length of flexible metal conduit carrying conductors with an output plug-in connector at one end and an input plug-in connector at the opposite end. The couplers are used to splice or join cables together. Such couplers have an input receptacle at one end and an output receptacle at the opposite end which are joined by appropriate conductors. The receptacles receive the plug-in connectors of the cables. The receptacle/plug-in connector arrangement not only makes for economical installation, but after installation are readily relocatable so to permit easy modification of power distribution and switching needs for the floor area below.

Depending upon the power service needs in the floor area, couplers are modified in various ways to form devices which are relocatable per se or which are hard wired to units served with power and relocatable therewith. Such devices are normally in the form of a "T" of an "X" and the like.

In one aspect the invention contemplates improved housing structure for couplers of the kind in question.

In another aspect the invention contemplates improved means for modifying the coupler so that it becomes a wiring adaptor which can be hard wired to a unit serviced with power such as a lighting fixture or a service pole.

The structure of the preferred embodiments of the invention and the advantages thereof will be understood from the description below taken in connection with the following drawings wherein:

FIG. 1 is an exploded view of a cable coupler constructed in accordance with the invention;

FIG. 2 is a perspective view of the parts of FIG. 1 as joined together;

FIG. 3 is a cross-sectional fragmentary view taken generally along the lines 3—3 in FIG. 2;

FIG. 4 is a perspective view of a plug-in bushing constructed in accordance with the invention;

FIG. 5 is an enlarged cross-sectional view illustrating the manner in which the bushing in FIG. 4 is mounted on a unit to be supplied with power;

FIG. 6 is a fragmentary elevational view taken along the lines 6—6 in FIG. 2 and illustrating how the housing sections are riveted together.

In FIG. 1 the cable coupler C has a housing formed by the improved housing sections 1 and 2 which are joined (FIG. 2) at the parting line 3. These housing sections are made by die casting and are identical in construction. For descriptive purposes, the housings are shown as being oriented in a horizontal direction so that the housing section 1 is the upper housing section and the housing section 2 is the lower housing section.

In the description which follows, the term coupler or cable coupler will be understood to refer to cable couplers of the kind shown in FIGS. 1 and 2 and the term wiring adaptor will refer to the coupler as modified for hard wiring to a unit to be supplied with power, the structure of the adaptor arrangement being shown in FIGS. 3 and 4.

Referring to FIGS. 1, 2, and 3, the upper and lower housings ae configured so that when abutted together at 3 the interior is hollow as indicated at 4. At the opposite ends 5 and 6 the housings also form two cavities, the cavity for the end 5 being indicated at 7. Each cavity has an internal opening and an external opening. Referring to FIG. 3, the internal opening for cavity 7 is indicated at 8. This puts the cavity 7 and the interior 4 in communication. The external opening for the cavity 7 is indicated at 8 which puts the cavity 7 in communication with the exterior. The housings 1 and 2 form the peripheral flanges 10 and 11 which respectively surround the exterior openings. The housings are formed with keepers for use with both double and single latch type plug-in connectors, the double type keeper being indicated at 12 and the single type keeper at 13.

A receptacle and wiring assembly 14 is disposed in the interior of the housing. The assembly includes the receptacles 15 and 16 and the conductors 17 which extend between the receptacles and are joined to terminals therein. The type of assembly as shown in FIG. 1 is conventional.

The unit of FIGS. 1, 2, and 3 is in the form of a coupler, i.e. a device for joining or splicing flexible cables, by that plug-in connectors on the ends of a flexible cable are adapted to be received by the cavities and to be inserted into the receptacles. The latch means on the connectors are connected to the keepers to hold the connectors in position.

When the plug-in connector is of the type wherein the housing is made of plastic, a metal shroud is used to cover the same. The shrouds are received and held by the flanges 10 and 11.

The details of the structure of the housings 1 and 2 will now be explained followed by a description of how the device is modified to function as a wiring adaptor.

As previously noted, the housing sections 1 and 2 are identical in construction and when a component on one is described it will be understood that the same component is on the other side.

Referring to section 2 in FIGS. 1 and 2, the section has a flat plate section 20 which is rectangular in shape and has an interior surface 21 and an exterior surface 22. In the center of the plate section 20 is an annular offset 23 which extends outwardly from the exterior surface 22. When the device is employed as a coupler, the offset is conditioned as shown. To convert the device to a wiring adaptor the offset is modified as will be explained later.

A pair of side walls 24 and 25 extend respectively along two opposite edges of the plate section. The walls extend outwardly of the interior surface 21. When the housing sections are joined together as shown in FIG. 2 the side walls abut along the parting line 3. This forms the sides of the coupler and closes off the hollow interior 4.

A pair of end walls 26 and 27 extend between the side walls 24 and 25 respectively along the other two opposite edges of the plate section 20.

To form the flanges 10 and 11, each end wall extends outwardly from the end walls 24 and 25 and also outwardly from the exterior surface 22 of the plate section 20.

To form the external openings 9, each end wall extends outwardly from the interior surface 21 of the plate section. In addition to forming the external openings 9, the end walls also serve as a support means for the plug-in connectors.

To form the internal openings 8, a pair of interior walls 30 and 31 are disposed inwardly of the end walls 26 and 27 and extend outwardly from the interior surface 21. The terminal edge of the walls 30 and 31 not only form the internal openings, but in addition are adapted to engage and support the receptacle means 15 and 16 as illustrated for receptacle 15 in FIG. 3.

In the space between the end walls 26 and 27 and the interior walls 30 and 31 and adjacent to these interior walls are a pair of steps, the step for the wall 30 being indicated at 32.

The terminal edges of the end walls and of the steps are coplanar as noted for the wall 26 and step 32 in FIG. 3. These terminal edges provide support means for the plug-in connectors.

To provide additional support for receptacles 15 and 12, risers 33 and 34 extend upwardly from the interior surface 21. As noted in FIG. 3 for receptacle 15, the risers 33 engage the receptacles and cooperate with the interior wall to prevent the receptacle from rocking.

The keepers 12 for the double latch type plug-in connectors are formed by L-shaped members which extend outwardly from the flange means. These keepers are adapted to receive the ends of the spring-biased arms on the connector. The single latch arm type takes the form of a slot 35 in the step 32 and aperture 36 of the plate section 21.

The housing sections 1 and 2 are joined together by means of rivet type connectors. At the intersection of the side walls and the interior walls there are pairs of posts 37 and 38. The posts 37 are provided with apertures 39 and the posts 38 are provided with studs 40. When the housing sections are abutting, the studs extend through the apertures. This allows for ends of the studs to be upset and flow into widened ends of the apertures as indicated at 41 in FIG. 6.

The modification of the cable coupler C to convert the same to function as a wiring adaptor to be hard wired to a unit to be serviced will next be described.

The modification involves the use of a plug-in bushing and an opening in an offset. The bushing is plugged into the offset opening and then the composite plugged into an opening in a mounting or access plate on the unit to be supplied with power. The wires for the unit extend from the receptacle and wiring assembly 10 through the bushing and into the unit, the assembly 14 being, of course, modified with the appropriate feed conductors to supply power to the unit with which the wiring adaptor will be used.

FIG. 4 illustrates the plug-in bushing 42. The bushing has an annular, split, cylindrically shaped body 43 which is made of blued, spring steel and provided with a corrosion-resistant coating of Nylon.

Centrally of the body 43 is a bulged-out area which forms a retainer 45. As noted, the retainer extends around the periphery of the body and outwardly thereof and divides the body into parts 43a and 43b. Body part 43a is lanced so as to form spring fingers 45 and 46 which extend outwardly of the body. Body part 43b is also lanced to form spring fingers 47 and 48 also extending outwardly from the body.

One of the offsets, for example the offset 23, is punched with an aperture 50. This is indicated by the dotted lines in FIG. 1 and is shown in FIG. 5. The diameter of the aperture is slightly less than the diameter of the parts 43a and 43b. The feed conductors extending from the receptacle and wiring assembly extend out through the aperture 50.

The bushing is secured by threading over the feed conductors, squeezing the part 43a so that it will enter the aperture 50 and the pushing in the bushing until the retainer 44 engages the exterior surface of the offset and the spring fingers 45 and 46 have engaged the interior surface of the offset. The engagement of the fingers and the retainer with the offset make a tight but sliding fit so that the bushing can be turned by finger pressure.

The unit is now in condition to be connected to the unit to be served. Such a unit will have a mounting or access plate such as the plate 51 shown in FIG. 5 and the plate will be provided with an aperture 52 the same diameter as the aperture 50. Thus, after the wires have been secured to the unit, the bushing is plugged into the plate 51 as is shown in FIG. 5 in a manner similarly as described above.

It will be observed that the assembly 14 has a conductor/terminal 17a. At the time of assembly, the terminal is placed on a stud so that it is gripped between the housing sections. This grounds the coupler.

Having described the invention, some of the advantages of the same will now be commented on.

One advantage is the universality of the design in that only a single form of die casting is needed to construct the two-part housing for use as a cable coupler or as a wiring adaptor with consequent reduction in tooling and inventory even for such multiple use. Another advantage is the low manufacturing cost achieved by a single form of die casting as above mentioned, by the use of a single punch-out made by standard tools to convert the coupler housing for use as a wiring adaptor and further achieved by that the plug-in bushing is fabricated by standard techniques and materials Moreover, the structure of the plug-in bushing is advantageous from the standpoint of ease of assembly in that it is installed without the use of special tools and after installation provides for turning of the adaptor so that the same can be quickly aligned with incoming and outgoing flexible cables.

We claim:

1. A coupler to join a pair of plug-in connectors in a wiring system comprising:
    a pair of identical housing sections abutting one another, the sections forming: (a) a hollow interior; (b) two oppositely disposed cavities; (c) an internal opening between each cavity and the interior of the housing; (d) an external opening between each cavity and the exterior; and (e) a pair of external flanges respectively around said external openings;
    a receptacle and wiring assembly disposed in said interior, the assembly having a pair of receptacle means and conductors connected to and extending between the receptacle means, the receptacle means having portions respectively disposed in said cavities in position for receiving plug-in connectors;
    each said housing section being characterized by:
        a flat, rectangular shaped plate section having an exterior surface and an interior surface;
        an annular offset section in the center of the plate section and extending outwardly from the exterior surface thereof;

a pair of side walls respectively extending along two opposite edges of the plate section and outwardly from said interior surface, the respective walls of the two housing sections abutting one another to form the sides of the coupler and closing off said interior;

a pair of end walls extending between said side walls and respectively disposed along the other two opposite edges of said plate section;

each end wall extending outwardly from its opposite side walls and also extending outwardly from the exterior surface of the plate section, said end wall extensions forming part of said external flange;

each end wall extending outwardly from the interior surface of the plate section, last said end wall extensions forming part of said external openings and providing support for a plug-in connector;

a pair of interior walls extending between said side walls and disposed inwardly of said end walls, the interior walls extending outwardly from said interior surface to respectively form part of said internal openings and engaging and providing support means for said receptacle means;

a pair of steps respectively disposed adjacent said interior walls in the spaces between the said end walls and said interior walls and extending outwardly from said interior surface, said steps cooperating with said end walls to provide additional support for a plug-in connector;

a plurality of risers respectively disposed adjacent said interior walls and extending upwardly from said interior surface respectively engaging and supporting said receptacle means; and rivet means connecting the housing sections together.

2. The coupler of claim 1 further including additional structure which converts the coupler to a wiring adaptor for use with devices to be energized, said additional structure comprising an aperture formed in one of said offset sections and a plug-in bushing in the aperture, the bushing being formed by:

a split, cylindrically shaped body, the body being made of spring steel;

retainer means extending around the periphery of the body and outwardly therefrom and extending the exterior surface of said offset section;

a first pair of spring fingers respectively formed on said body on one side of said retainer means and engaging the inside surface of said offset section whereby to secure the bushing to the offset section;

a second pair of spring fingers respectively formed on said body on the opposite side of said retainer means, the second fingers being adapted to cooperate with the retainer means to secure the bushing to an access plate or the like on the device to be energized by that the body extends through an aperture in the access plate with the second pair of fingers engaging one side of the access plate and the retainer engaging the other side of the access plate; and said aperture and said bushing providing passageway means for conductors extending between said assembly and the wiring fixture.

* * * * *